US010877258B2

(12) United States Patent
Honegger et al.

(10) Patent No.: US 10,877,258 B2
(45) Date of Patent: *Dec. 29, 2020

(54) MICROSCOPE

(71) Applicant: LEICA MICROSYSTEMS (SCHWEIZ) AG, Heerbrugg (CH)

(72) Inventors: Marc Honegger, Romanshorn (CH); Harald Schnitzler, Lüchingen (CH); Reto Zuest, Diepoldsau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 7 days.

This patent is subject to a terminal disclaimer.

(21) Appl. No.: 15/515,642

(22) PCT Filed: Jul. 15, 2015

(86) PCT No.: PCT/EP2015/066104
§ 371 (c)(1),
(2) Date: May 31, 2017

(87) PCT Pub. No.: WO2016/055177
PCT Pub. Date: Apr. 14, 2016

(65) Prior Publication Data
US 2017/0254998 A1 Sep. 7, 2017

(30) Foreign Application Priority Data
Oct. 6, 2014 (DE) .................. 10 2014 114 476

(51) Int. Cl.
*G02B 21/36* (2006.01)
*G02B 21/24* (2006.01)
(Continued)

(52) U.S. Cl.
CPC ......... *G02B 21/244* (2013.01); *G02B 21/245* (2013.01); *G02B 21/365* (2013.01);
(Continued)

(58) Field of Classification Search
None
See application file for complete search history.

(56) References Cited

U.S. PATENT DOCUMENTS 4,636,051 A  1/1987  Shippey
6,128,129 A  10/2000 Yoneyama
(Continued)

FOREIGN PATENT DOCUMENTS

DE  2836428 A1  3/1980
DE  2812593 C2  7/1982
(Continued)

*Primary Examiner* — Shadan E Haghani
(74) *Attorney, Agent, or Firm* — Hodgson Russ LLP

(57) ABSTRACT

A microscope (10) is described, having an autofocus system (11) for executing a focusing procedure, having a first image sensor (14a), arranged in a first outcoupled beam path (12a), for acquiring a first image (16a); and a second image sensor (14b), arranged in a second outcoupled beam path (12b), for acquiring a second image (16b). The autofocus system (11) is embodied to ascertain a contrast difference based on contrast values of the first image (16a) acquired by the first image sensor (14a) and of the second image (16b) acquired by the second image sensor (14b), and to set a relative location of the focal plane (20) with respect to the object plane (22) based on the ascertained contrast difference, the first and the second image (16a, 16b) each encompassing image information furnished by the first and the second image sensor (14a, 14b) each embodied as an area sensor.

10 Claims, 8 Drawing Sheets

(51) Int. Cl.
*H04N 5/232* (2006.01)
*H04N 5/225* (2006.01)

(52) U.S. Cl.
CPC ......... *G02B 21/367* (2013.01); *H04N 5/2258* (2013.01); *H04N 5/23212* (2013.01); *H04N 5/232123* (2018.08)

(56) References Cited

U.S. PATENT DOCUMENTS

| | | | | |
|---|---|---|---|---|
| 6,538,719 | B1* | 3/2003 | Takahashi | G03F 7/70358 355/53 |
| 7,929,044 | B2* | 4/2011 | Chen | H04N 5/23212 348/345 |
| 8,436,932 | B2* | 5/2013 | Hofer | H04N 5/23212 348/345 |
| 9,041,930 | B1* | 5/2015 | Young | G01J 3/02 356/419 |
| 9,210,314 | B2* | 12/2015 | Yasuda | H04N 5/23212 |
| 9,297,995 | B2* | 3/2016 | Kramer | G02B 21/0004 |
| 2003/0184855 | A1 | 10/2003 | Yasuda et al. | |
| 2004/0080661 | A1 | 4/2004 | Afsenius et al. | |
| 2008/0099661 | A1* | 5/2008 | Virag | G02B 21/242 250/201.3 |
| 2008/0240528 | A1 | 10/2008 | Tumpner | |
| 2012/0075455 | A1 | 3/2012 | Hiraide | |
| 2012/0099852 | A1* | 4/2012 | Staker | G02B 21/365 396/432 |
| 2013/0027538 | A1* | 1/2013 | Ding | H04N 7/183 348/79 |
| 2013/0321769 | A1* | 12/2013 | Kusumoto | A61B 3/1025 351/206 |
| 2014/0362203 | A1* | 12/2014 | Delaney | H04N 5/2354 348/79 |

FOREIGN PATENT DOCUMENTS

| | | |
|---|---|---|
| DE | 3735091 A1 | 4/1988 |
| DE | 3739223 A1 | 6/1989 |
| DE | 69231269 T2 | 2/2001 |
| JP | S595214 A | 1/1984 |
| JP | H09127403 A | 5/1997 |
| JP | H09189850 A | 7/1997 |
| JP | 2002196247 A | 7/2002 |
| JP | 2003270519 A | 9/2003 |
| JP | 2009008787 A | 1/2009 |
| JP | 2012073285 A | 4/2012 |

* cited by examiner

MICROSCOPE

CROSS-REFERENCE TO RELATED APPLICATIONS

The present application is the U.S. national phase of International Application No. PCT/EP2015/066104 filed Jul. 15, 2015, which claims priority of German Application No. 10 2014 114 476.7 filed Oct. 6, 2014, the entire disclosure of which is incorporated herein by reference.

FIELD OF THE INVENTION

The invention relates to a microscope having an autofocus system having a first image sensor, arranged in a first outcoupled beam path, for acquiring a first image; and a second image sensor, arranged in a second outcoupled beam path, for acquiring a second image.

BACKGROUND OF THE INVENTION

In known active autofocus systems, an auxiliary pattern or auxiliary beam is projected onto the surface of the object to be examined, and the reflected radiation is evaluated. An auxiliary pattern is typically overlaid coaxially for observation. In order for the auxiliary pattern to be suitable for a wide observation magnification range, however, the projection must be adapted to the respective objective field by means of additional optics. Auxiliary beams, on the other hand, are usually projected paraxially, for example with the aid of triangulation. Laser light sources or light-emitting diodes (LEDs) are usually used for this. The corresponding method is also referred to as a "laser autofocus" or "LED autofocus" method. A complex collimation and imaging optic is necessary for this as well, however. In addition, with paraxial imaging a second optic is usually required for detection and evaluation. The mutual alignment of these two optics influences focusing precision. Wavelengths beyond the visible spectrum, usually in the infrared (IR) band, are used so as not to degrade the image of the object for the viewer. The predominant majority of microscopes, on the other hand, are designed for use in the visible wavelength region. A chromatic correction with the aid of an apochromat is carried out, for example, in this context. With the known methods this results in a longitudinal chromatic aberration in the image for the auxiliary IR beam, which is expressed in turn as an "offset" with respect to the focus position perceived by the viewer. This offset can be corrected by way of a "lead." With a modular configuration or a continuous zoom system, however, this is complex and can result in incorrect operation or malfunction. With semiconductors in particular, the wavelength-dependent penetration depth results in an object-dependent offset that cannot be corrected or can be respectively corrected only for one type of object.

The reliability of all active autofocus systems depends on the reflection properties of the object to be examined. As a result, in particular in the context of paraxial projection, considerable differences can occur between the image of the object and the projected auxiliary beam or projected auxiliary pattern. This results in discrepancies in focusing, and in extreme cases in complete failure.

FIGS. 5 to 7 show various embodiments of a microscope according to the existing art. FIG. 5 shows an embodiment of a microscope with digital image acquisition with no autofocus system. FIG. 6 shows an embodiment of a microscope with visual viewing with no autofocus system. FIG. 7 shows an embodiment of a microscope having a constant image-side numerical aperture and thus a constant spacing between a first and a second sensor in an axial direction over the imaging scale.

SUMMARY OF THE INVENTION

Proceeding from the known existing art, the object of the invention is to describe a microscope having an autofocus system which makes possible high precision, great rapidity, and improved robustness in terms of focusing.

This object is achieved by way of a microscope having the features described herein. Advantageous refinements are also described herein.

Advantageous focusing is achieved by way of a microscope having a novel autofocus system, in particular because the autofocus system is embodied to ascertain a contrast difference based on contrast values of the first image acquired by the first image sensor and of the second image acquired by the second image sensor, and to set a relative location of the focal plane with respect to the object plane based on the ascertained contrast difference. In this context, the first and the second image each encompass image information furnished by the first and the second image sensor each embodied as an area sensor. Focusing can thus be carried out flexibly and without significant limitations. Focusing is furthermore achieved relatively quickly and precisely. This enables high precision, great rapidity, and improved robustness in terms of focusing.

Instead of two or more image sensors, it is also possible for only one image sensor to be used. Its area is then divided into at least two sub-regions. This one image sensor can be used, for example, in combination with two beam splitters. In an alternative embodiment, the two sub-regions of the image sensor can also be generated by a lens array in only one beam path.

The elements explained here, and their functions, refer to the use of two or more image sensors. These elements and their functions can furthermore also refer correspondingly to the use of only one image sensor having two sub-regions. Here the first image generatable in a first sub-region on the first image sensor corresponds substantially to the first image acquired by a first of the two or more image sensors, while the second image generatable in a second sub-region on the one image sensor corresponds substantially to the second image acquired by a second of the two or more image sensors.

Preferably the autofocus system is embodied in such a way that the focusing procedure is executable on the basis of at least a first operating mode and a second operating mode.

The autofocus system is configured in such a way that in the first operating mode it ascertains contrast values of the first image acquired by the first image sensor and of the second image acquired by the second image sensor, and in the second operating mode it ascertains contrast values of the first image acquired by the first image sensor and of the second image acquired by the second image sensor, and sets a relative location of the focal plane with respect to the object plane based on the ascertained contrast values. The autofocus system is furthermore embodied to set the relative location of the focal plane with respect to the object plane in the first operating mode in such a way that the focal plane lies within a first tolerance region around the object plane, and to set the relative location of the focal plane with respect to the object plane in the second operating mode in such a way that the focal plane lies within a second tolerance region around the object plane. The second tolerance region is smaller than the first tolerance region. In addition, comparatively coarse focusing is achieved in the first operating mode, while comparatively fine focusing is achieved in the second operating mode. The comparatively coarse focusing in the first operating mode can be carried out relatively quickly. In addition, the comparatively fine focusing in the second operating mode can be carried out relatively precisely.

It is furthermore advantageous if the autofocus system is embodied to carry out a direction recognition for setting the relative location of the focal plane with respect to the object plane, based on a comparison of a first contrast value of the first image acquired by the first image sensor and a second contrast value of the second image acquired by the second image sensor. The algorithm according to the present invention thus supplies not only the distance over which the specimen is to be displaced, but also the direction in which it is to be displaced. In addition, defocusing can be identified and quantified with the aid of the contrast evaluation.

The autofocus system is embodied to set the relative location of the focal plane with respect to the object plane, based on the direction recognition, in such a way that if the first contrast value of the first image acquired by the first image sensor is greater than the second contrast value of the second image acquired by the second image sensor, the focal plane is shifted toward the object plane, or the object plane toward the focal plane, so that the spacing between the focal plane and the object plane decreases.

The autofocus system is furthermore embodied to set the relative location of the focal plane with respect to the object plane, based on the direction recognition, in such a way that if the second contrast value of the second image acquired by the second image sensor is greater than the first contrast value of the first image acquired by the first image sensor, the focal plane is shifted away from the object plane, or the object plane away from the focal plane, so that the spacing between the focal plane and the object plane increases.

It is furthermore advantageous if the microscope is characterized by an imaging system having: a third image sensor; an objective; a first beam splitter; and a second beam splitter, the first beam splitter being arranged in a beam path between the objective and the third image sensor and in a beam path between the objective and the first image sensor, and the second beam splitter being arranged in a beam path between the objective and the third image sensor and in a beam path between the objective and the second image sensor. As a result, the first outcoupled beam path and the second outcoupled beam path for the autofocus system can be coupled out of the beam path between the objective and the third image sensor.

Optionally, instead of the third image sensor an eyepiece can also be provided in the imaging system of the microscope. The autofocus system according to the present invention can also be installed in a conventional microscope.

Preferably the first beam splitter is embodied to generate the first image plane conjugated with the object plane, while the second beam splitter is embodied to generate the second image plane conjugated with the object plane.

It is furthermore advantageous if the first beam splitter and the second beam splitter are arranged, spaced apart from one another, in the beam path between the objective and the third image sensor if the first image plane conjugated with the object plane and the second image plane conjugated with the object plane are located at a spacing from one another, and if the spacing between the first image plane conjugated with the object plane and the second image plane conjugated with the object plane corresponds to the spacing between the first beam splitter and the second beam splitter. As a result, the first image sensor can be arranged in the first outcoupled beam path, and the second image sensor in the second outcoupled beam path, between the first image plane conjugated with the object plane and the second image plane conjugated with the object plane. Preferably the first image sensor arranged in the first outcoupled beam path, and the second image sensor arranged in the second outcoupled beam path, lie in the same plane, which is at the same spacing with respect the first image plane conjugated with the object plane and with respect to the second image plane conjugated with the object plane.

Preferably the second tolerance region is smaller than or equal to half the first tolerance region.

Preferably the first tolerance region corresponds to at least 2.5 times the depth of focus of the microscope, while the second tolerance region corresponds at most to the depth of focus of the microscope. The result is that, in particular, comparatively fine focus can be achieved with high precision.

It is furthermore advantageous if the image sensor is an area sensor. A microscope with digital image production which has improved contrast evaluation can thereby be implemented.

It is furthermore advantageous if the user can select on the image sensor a sub-region (region of interest, ROI) on which the focus calculation is executable. This makes it possible to determine the elevation on the object at which focusing is to occur.

It is furthermore advantageous if the autofocus system is embodied in such a way that the focusing procedure executable based on the first operating mode is carried out only one single time, and the focusing procedure executable based on the second operating mode is repeated until a predefined termination condition is satisfied. Continuous focusing with a predefined termination condition can thereby be implemented.

It is furthermore advantageous if the autofocus system is embodied to set the relative location of the focal plane with respect to the object plane in the second operating mode in such a way that the spacing between the focal plane and the object plane is decreased by an amount equal to an offset ascertained based on the contrast difference. The comparatively fine focusing can thereby be carried out relatively precisely and very largely independently of the nature of the object.

It is furthermore advantageous if the autofocus system is embodied to adjust a relative location of the focal plane with respect to the object plane, at a focus displacement speed, during the image acquisition time for acquisition of the first image acquired by the image sensor and of the second image acquired by the second image sensor. The focus displacement speed here is equal to the ratio of the increment to the image acquisition time. The increment is furthermore larger than the depth of focus of the microscope. It is thereby possible to achieve a shortening of the time required for focusing without resulting in any substantial motion blur due to integration of the first image acquired by the first image sensor and of the second image acquired by the second image sensor.

It is furthermore advantageous if the increment is larger than or equal to 2.5 times the depth of focus of the microscope. Preferably the increment is smaller than or equal to 10 times the depth of focus of the microscope. The result is that on the one hand the time required for focusing can be substantially shortened, and on the other hand motion blur due to image integration can at the same time be avoided or at least decreased.

The focus displacement speed is preferably constant.

According to a further exemplifying embodiment the microscope encompasses an autofocus system for executing a focusing procedure, having an image sensor, arranged in an outcoupled beam path, for acquiring a first image and a second image. A lens array, with which the first image is generatable in a first sub-region on the one image sensor and the second image is generatable in a second sub-region on the one image sensor, is arranged in the outcoupled beam path. The autofocus system is furthermore embodied to adjust a relative location of the focal plane with respect to the object plane, at a focus displacement speed, during the image acquisition time for acquisition of the first image and the second image acquired by the image sensor. The focus displacement speed here is equal to the ratio of an increment to the image acquisition time. The increment is furthermore larger than the depth of focus of the microscope.

BRIEF DESCRIPTION OF THE DRAWING VIEWS

Further features and advantages of the invention are evident from the description that follows, which explains the invention in further detail with reference to exemplifying embodiments in conjunction with the appended Figures, in which:

FIG. 1a schematically depicts a microscope according to the present invention having an autofocus system for setting the relative location of the focal plane with respect to the object plane;

FIG. 1b schematically depicts the microscope according to the present invention having the autofocus system according to FIG. 1a, for setting the focal plane within a first tolerance region and within a second, smaller tolerance region around the object plane;

DETAILED DESCRIPTION OF THE INVENTION

A first aspect of the present invention deals with the disadvantage that focusing in known autofocus systems is not effective enough.

Figure 1A:
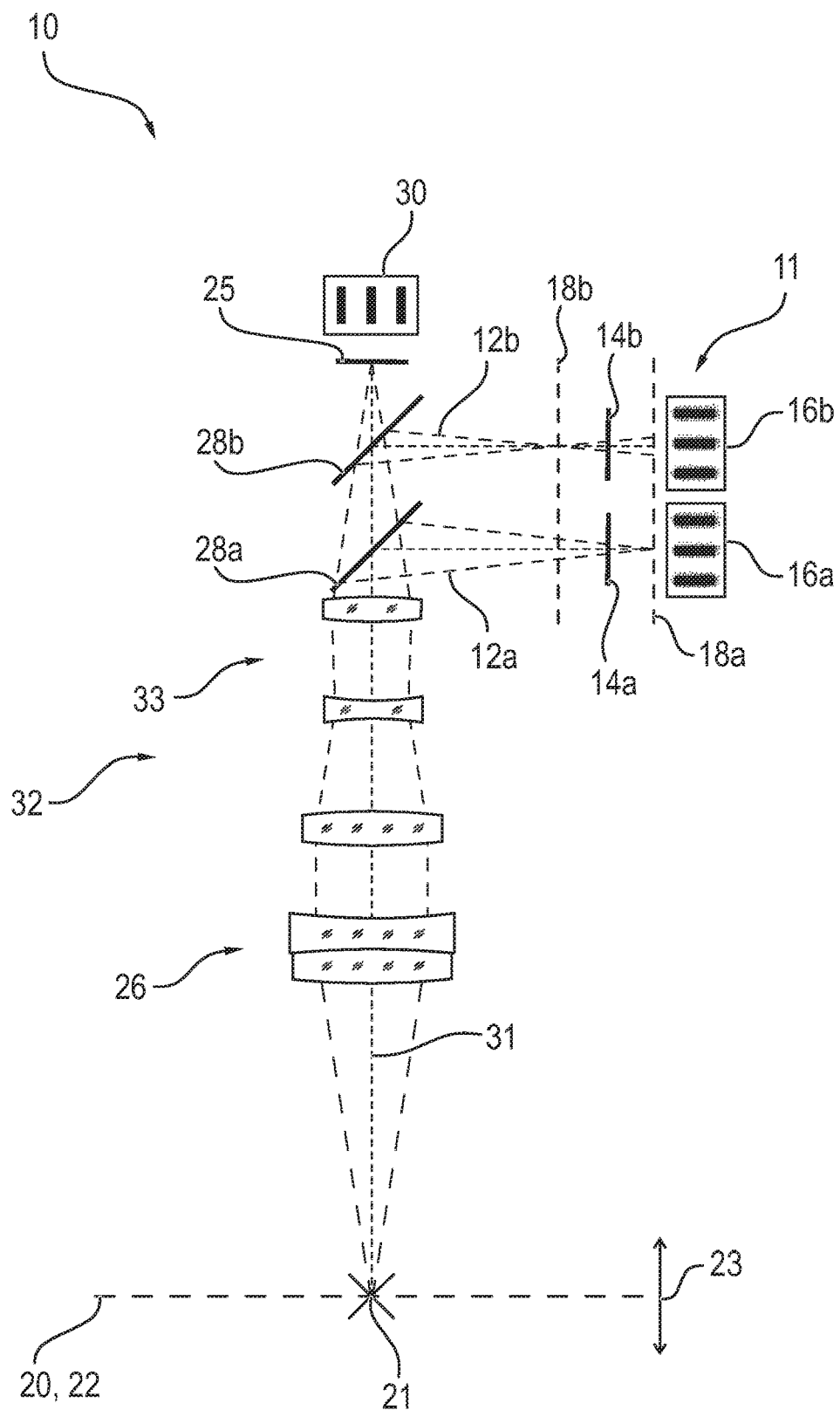

FIG. 1a schematically depicts a microscope 10 according to the present invention having an autofocus system 11 for setting the relative location of focal plane 20 with respect to object plane 22. As shown in FIG. 1a, autofocus system 11 encompasses a first image sensor 14a, arranged in a first outcoupled beam path 12a, for acquiring a first image 16a; and a second image sensor 14b, arranged in a second outcoupled beam path 12b, for acquiring a second image 16b. FIG. 1a shows in particular that a first image plane 18a conjugated with object plane 22 is associated with first image sensor 14a, and first image sensor 14a is arranged in first outcoupled beam path 12a before (in the light flow direction) first image plane 18a conjugated with object plane 22. FIG. 1a furthermore shows that a second image plane 18b conjugated with object plane 22 is associated with second image sensor 14b, and second image sensor 14b is arranged in second outcoupled beam path 12b after (in the light flow direction) second image plane 18b conjugated with object plane 22.

Microscope 10 shown in FIG. 1a is characterized by an imaging system 32 having a third image sensor 25, an objective 26, a first beam splitter 28a, and a second beam splitter 28b. First beam splitter 28a is arranged in a beam path between objective 26 and third image sensor 25, and in a beam path between objective 26 and first image sensor 14a. Second beam splitter 28b is furthermore arranged in a beam path between objective 26 and third image sensor 25, and in a beam path between objective 26 and second image sensor 14b. Third image sensor 25 of microscope 10 shown in FIG. 1a serves to acquire a third image 30.

As shown in FIG. 1a, first beam splitter 28a serves to generate first image plane 18a conjugated with image plane 22. Second beam splitter 28b furthermore serves to generate second image plane 18b conjugated with object plane 22. First beam splitter 28a is arranged in such a way that first outcoupled beam path 12a is coupled out of the beam path between objective 26 and third image sensor 25. Second beam splitter 28b is furthermore arranged in such a way that second outcoupled beam path 12b is coupled out of the beam path between objective 26 and third image sensor 25.

Imaging system 32 of microscope 10 shown in FIG. 1a serves for optical imaging of object plane 22 onto first image plane 18a conjugated with object plane 22, and onto second image plane 18b conjugated with object plane 22. Imaging system 32 encompasses a zoom system 33, whose construction is known to one skilled in the art and which is not described in further detail here.

With microscope 10 according to the present invention, first beam splitter 28a and second beam splitter 28b are arranged, spaced apart from one another, in the beam path between objective 26 and third image sensor 25. In addition, first image plane 18a conjugated with object plane 22 and second image plane 18b conjugated with object plane 22 are located at a spacing from one another. The spacing between first image plane 18a conjugated with object plane 22 and second image plane 18b conjugated with object plane 22 corresponds to the spacing between first beam splitter 28a and second beam splitter 28b. As shown in FIG. 1a, first image sensor 14a and second image sensor 14b are arranged between first image plane 18a conjugated with object plane 22 and second image plane 18b conjugated with object plane 22. Preferably, first image sensor 14a and second image sensor 14b respectively have the same spacing with respect to first image plane 18a conjugated with object plane 22 and with respect to second image plane 18b conjugated with object plane 22.

Autofocus system 11 of microscope 10 shown in FIG. 1a serves to set the relative location of focal plane 20 with respect to object plane 22. This is depicted schematically in FIG. 1a by arrow 23. Focal plane 20 extends through focus 21 of objective 26 of imaging system 32. In addition, focal plane 20 is located perpendicularly to the optical axis of the beam path between focus 21 and third image sensor 25.

FIG. 1a schematically depicts the perfectly focused state of microscope 10, focal plane 20 being located exactly in object plane 22. Setting of the focused state is achieved by a shift of focal plane 20 toward object plane 22, or by a shift of object plane 22 toward focal plane 20. The shift occurs parallel to optical axis 31 of the beam path. In a further embodiment, the relative shift of object plane 22 and focal plane 20 can occur at a known angle between optical axis 31 and the object plane. In the focused state, optical axis 31 preferably passes through the center of the object plane.

Figure 1B:
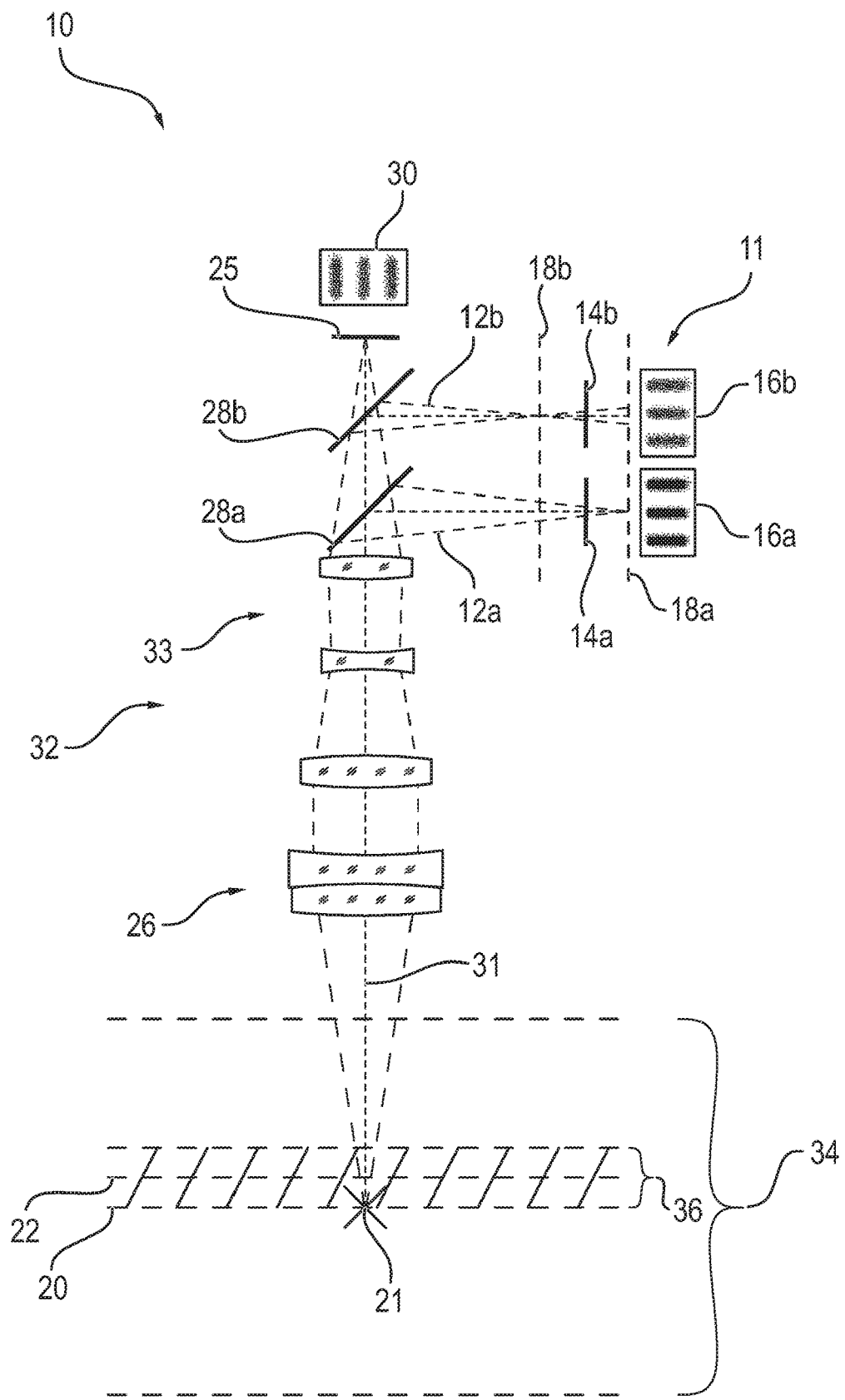

FIG. 1b schematically depicts microscope 10 according to the present invention having autofocus system 11 according to FIG. 1a, for setting focal plane 20 within a first tolerance region 34 and within a second, smaller tolerance region 36 around object plane 22. FIG. 1b schematically depicts the not-perfectly focused state, i.e. the state focused within a tolerance region, of microscope 10, such that focal plane 20 does not lie exactly in object plane 22. Instead, focal plane 20 lies within first tolerance region 34 or within second, smaller tolerance region 36 around object plane 22.

Preferably, first tolerance region 34 corresponds to at least 2.5 times the depth of focus of microscope 10, while second tolerance region 36 corresponds at most to the depth of focus of microscope 10. In other words, FIG. 1b shows the focused state of microscope 10 within a tolerance region located approximately in the depth of focus. This focused state shown in FIG. 1b is set by way of a shift of focal plane 20 toward object plane 22. Focal plane 20 is firstly shifted from a region located outside first tolerance region 34 into first tolerance region 34. Focal plane 20 is then shifted from first tolerance region 34 into second, smaller tolerance region 36. Thus firstly a comparatively coarse focus is achieved, and then a comparatively fine focus.

Alternatively, with microscope 10 shown in FIG. 1b object plane 22 can also be shifted toward focal plane 20 in order to achieve the comparatively coarse focus and comparatively fine focus.

Autofocus system 11 furthermore serves for evaluation of the image analysis data, for example contrast values, of first image 16a acquired by first image sensor 14a and of second image 16b acquired by second image sensor 14b. The relative location of focal plane 20 with respect to object plane 22 is set based on this evaluation of the image analysis data or contrast values.

Referring to FIG. 1b, the relative location of focal plane 20 with respect to object plane 22 is set with autofocus system 11 in such a way that focal plane 20 is shifted toward object plane 22, or object plane 22 is shifted toward focal plane 20, if a first contrast value of first image 16a acquired by first image sensor 14a is greater than a second contrast value of second image 16b acquired by second image sensor 14b.

First image sensor 14a and second image sensor 14b are preferably each digital image sensors having a two-dimensional arrangement of pixels. In particular, the sensors are also known to one skilled in the art as "area sensors." The area sensors usefully correspond approximately to the image field, since selective focusing onto all the different object regions can then be carried out.

Figure 2:
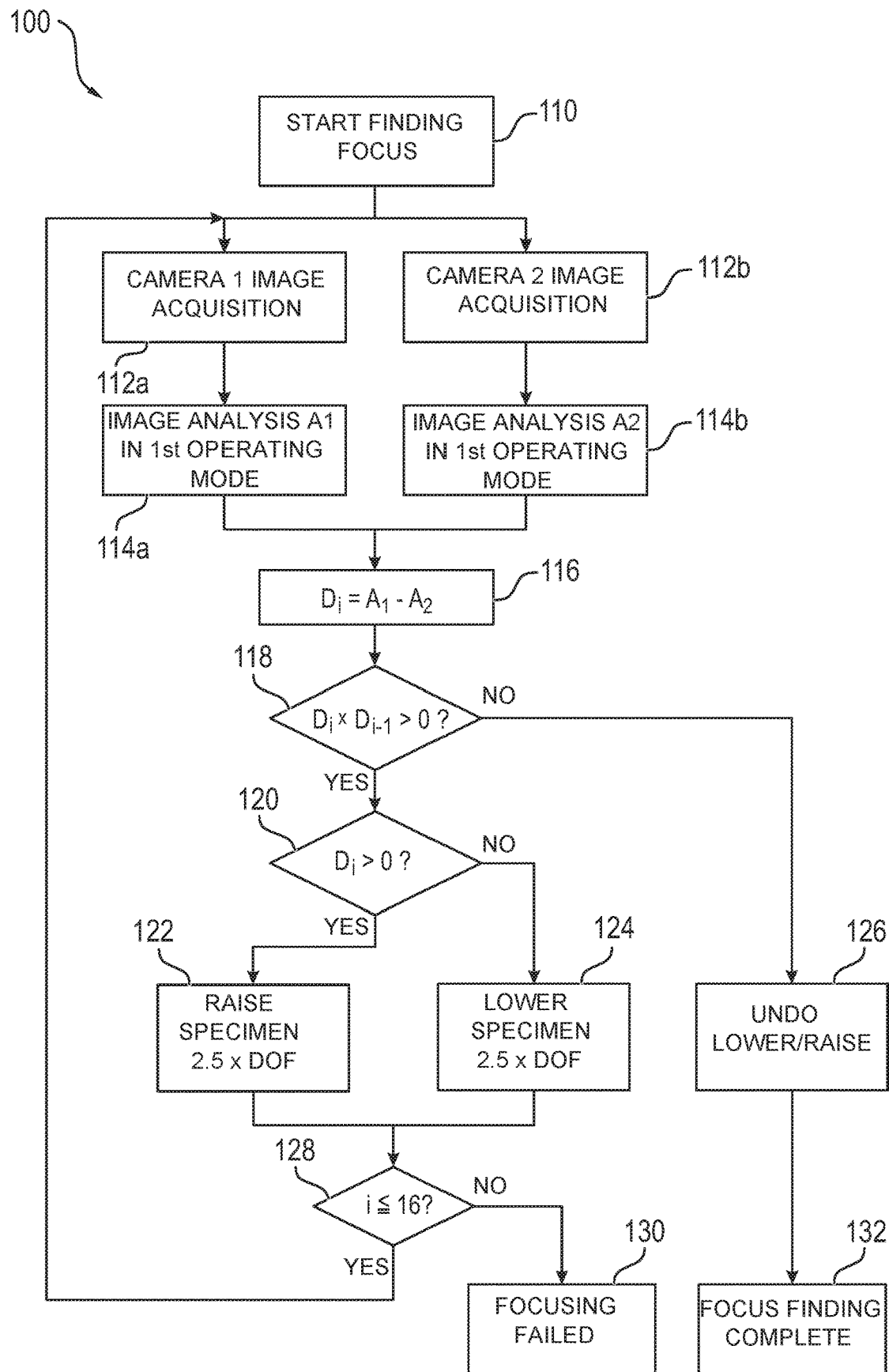
FIG. 2 is a flow chart of a method for carrying out comparatively coarse focusing in a first operating mode of the microscope according to the present invention.

FIG. 2 shows a flow chart of a method 100 for carrying out comparatively coarse focusing in a first operating mode of microscope 10 according to the present invention. Method 100 shown in FIG. 2 is used to set the relative location of focal plane 20 with respect to object plane 22 in the first operating mode in such a way that focal plane 20 lies within first tolerance region 34 around object plane 22.

Method 100 encompasses a step 110 labeled "Start finding focus." This step 110 represents the beginning of method 100 for carrying out comparatively coarse focusing. Method 100 furthermore encompasses steps 112a, 112b labeled "Camera 1 image acquisition" and "Camera 2 image acquisition." During step 112a, first image 16a is acquired by first image sensor 14a. During step 112b, second image 16b is acquired by second image sensor 14b. Method 100 furthermore encompasses steps 114a, 114b respectively labeled "Image analysis $A_1$ for 1st operating mode" and "Image analysis $A_2$ for 1st operating mode." During step 114a a first image analysis $A_1$ is carried out based on first image 16a acquired by first image sensor 14a. During step 114b, an image analysis $A_2$ is similarly carried out based on second image 16b acquired by second image sensor 14b. Method 100 furthermore encompasses a step 116 for evaluating the image analysis data, for example contrast values, ascertained during steps 114a, 114b. In particular, in step 116 the difference $D_i$ of the image analysis data is calculated:

$$D_i = A_1 - A_2,$$

where $D_i$ is the difference of the image analysis data (for example, contrast value difference), $A_1$ is the first image analysis data (for example, first contrast value) ascertained from step 114a, and $A_2$ is the second image analysis data (for example, contrast value) ascertained from step 114b; i here is an integer index that indicates the i-th iteration of the iteratively executable method 100.

Method 100 furthermore encompasses a step 118 for comparing the image analysis differences (for example, contrast value differences), using the equation $$D_i * D_{i-1} > 0,$$

where $D_i$ is the difference of the image analysis data (contrast value difference) ascertained during the current iteration of method 100, and $D_{i-1}$ is the difference of the image analysis data (for example, contrast value difference) ascertained during the previous iteration of method 100. Method 100 furthermore encompasses a step 120 for evaluating the contrast value difference ascertained during step 116. Step 120 is carried out if the comparison carried out during step 118 is positive, i.e. if the condition according to the equation above is satisfied. During step 120 a check is made as to whether the following condition $$D_i > 0$$

is satisfied. Method 100 furthermore encompasses a step 122 labeled "Raise specimen 2.5×DOF" and a step 124 labeled "Lower specimen 2.5×DOF." Step 122 is carried out if the condition tested during step 120 is satisfied, while step 124 is carried out if the condition tested during step 120 is not satisfied. During step 122 the specimen is raised by an amount equal to 2.5 times the depth of focus. During step 124 the specimen is lowered by an amount equal to 2.5 times the depth of focus. The specimen to be examined is located substantially in object plane 22 shown in FIGS. 1a and 1b. The method furthermore encompasses a step 128 for assessing termination or repeated execution of method 100. During step 128 a check is made as to whether the following condition:

$$i \leq X$$

is satisfied, where X represents the upper limit of the number of iterations. The upper limit X can be defined, for example, as 30 or fewer, for example between 15 and 20. Method 100 furthermore encompasses a block 130 labeled "Focusing failed." Block 130 indicates that the condition checked during step 128 was not satisfied, i.e. if more than 16 iterations of method 100 had already been carried out. Otherwise the method is carried out repeatedly beginning with steps 112a, 112b.

Method 100 furthermore encompasses a step 126 labeled "Undo lower/raise." Step 126 is carried out if the comparison carried out during step 118 is negative, i.e. if the difference (e.g. contrast value difference) of the current iteration of method 100 and the difference (e.g. contrast value difference) of the previous iteration of method 100 are different. During step 126, the raising of the specimen carried out during step 122, or the lowering of the specimen carried out during step 124, is undone, i.e. the specimen is respectively lowered or raised by an amount equal to 2.5 times the depth of focus. Method 100 furthermore encompasses a block 132 labeled "Focus finding complete."

Block 130 represents the end of method 100 in a context in which useful focusing with method 100 is not possible. Block 132 represents the end of method 100 in a context in which focusing has been successfully carried out.

Method 100, described with reference to FIG. 2, for carrying out comparatively coarse focusing represents a method for finding the focus during an automatic focusing procedure.

Figure 3:
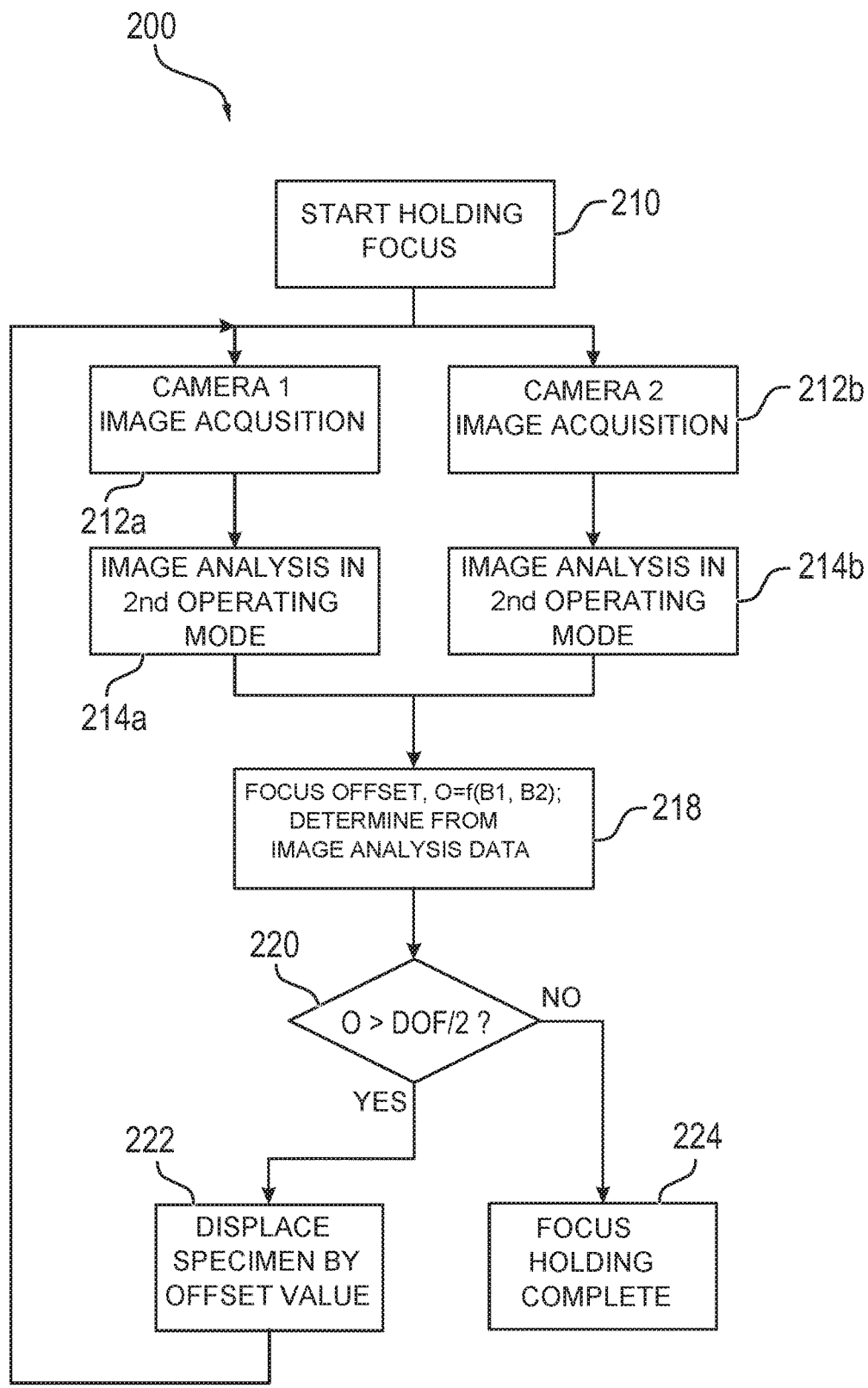
FIG. 3 is a flow chart of a method for carrying out comparatively fine focusing in a second operating mode of the microscope according to the present invention.

FIG. 3 shows a flow chart of a method 200 for carrying out comparatively fine focusing in a second operating mode of microscope 10 according to the present invention. Method 200 shown in FIG. 3 can be used to set the relative location of focal plane 20 with respect to object plane 22 in the second operating mode in such a way that focal plane 20 lies within second tolerance region 36, which is smaller as compared with first tolerance region 34, around object plane 22.

Method 200 encompasses a step 210 labeled "Start holding focus." Step 210 represents the beginning of method 200 for carrying out comparatively fine focusing. Method 200 furthermore encompasses a step 212a labeled "Camera 1 image acquisition" and a step 212b labeled "Camera 2 image acquisition." During step 212a first image 16a is acquired by first image sensor 14a. During step 212b second image 16b is acquired by second image sensor 14b. Method 200 further encompasses a step 214a, 214b respectively labeled "Image analysis in 2nd operating mode." During step 214a, 214b image analysis data, for example, a first contrast value B1, of first image 16a acquired by first image sensor 14a are ascertained. During step 214b further image analysis data, e.g. a further contrast value B2, of second image 16b acquired by second image sensor 14b, are ascertained. Method 200 furthermore encompasses a step 218 labeled "Focus offset, O=f(B1, B2); determine from image analysis data." During step 218 a value for the shift of the specimen (also referred to as an "offset") is ascertained using the following functional correlation:

$$O=f(B1,B2)$$

where O is the offset and B1 and B2 are the image analysis values. Method 200 furthermore encompasses a step 220 for checking the following condition:

$$O>DOF/2$$

where O is the offset and DOF the depth of focus of microscope 10. Method 200 furthermore encompasses a step 222 labeled "Displace specimen by offset value" and a block 224 labeled "Focus holding complete." Step 222 is carried out if the condition checked during step 220 is satisfied. During step 222 the specimen is displaced by an amount equal to the offset ascertained during step 218. The specimen to be examined is located substantially in object plane 22 shown in FIGS. 1a and 1b. Once step 222 has been carried out, method 200 is carried out repeatedly beginning with steps 212a, 212b. If the condition checked during step 220 is not satisfied, block 224 then follows. Block 224 represents the end of method 200.

Method 200, described on the basis of FIG. 3, for carrying out comparatively fine focusing represents a method for holding focus during an automatic focusing procedure.

Referring to FIGS. 2 and 3, the automatic procedure for focusing is divided into two different phases or methods 100, 200. Method 100 shown in FIG. 2 is used to find the focus, while method 200 shown in FIG. 3 is used to hold the focus. With method 100 for finding the focus, a large capture region takes precedence, the "capture region" being defined as the greatest distance from the focus position at which a direction recognition for arriving at the focus position is still possible. With method 200 for holding the focus, the precision with which the focal plane can be determined is crucial. "Precision" is defined in this context as the remaining deviation of the arrived-at focus position from the ideal focus position.

It is noteworthy that with both image analyses, a two-dimensional image area is evaluated. It is advantageous in this context that the contrast evaluation or image analysis is not accomplished only along one line. In addition, the contrast evaluation is also not carried out only relative to the closest neighboring pixel.

Figure 4A:
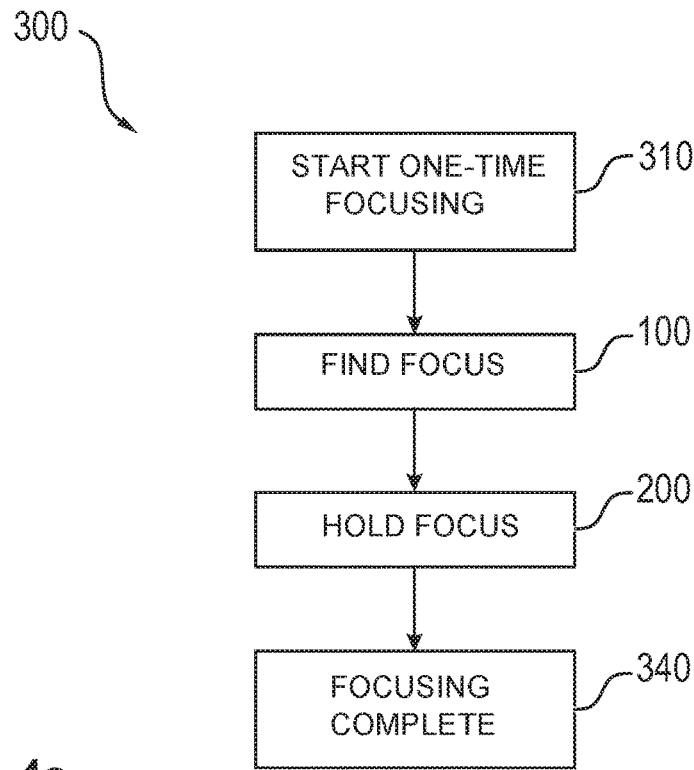
FIG. 4a is a flow chart of a method for carrying out one-time focusing, according to an exemplifying embodiment of the present invention.

FIG. 4a is a flow chart of a method 300 for carrying out one-time focusing, according to an exemplifying embodiment of the present invention. Method 300 encompasses: step 310 labeled "Start one-time focusing," method 100 labeled "Find focus," method 200 labeled "Hold focus," and a block 340 labeled "Focusing complete." During step 310, one-time focusing using autofocus system 11 of microscope 10 is begun. Method 100 for finding the focus is then carried out as described with reference to FIG. 2. Method 200 for holding the focus is then carried out as described with reference to FIG. 3. Block 340 represents the end of focusing. In method 300, shown in FIG. 4a, for carrying out one-time focusing, method 100 for finding the focus and method 200 for holding the focus are each carried out only one single time.

Figure 4B:
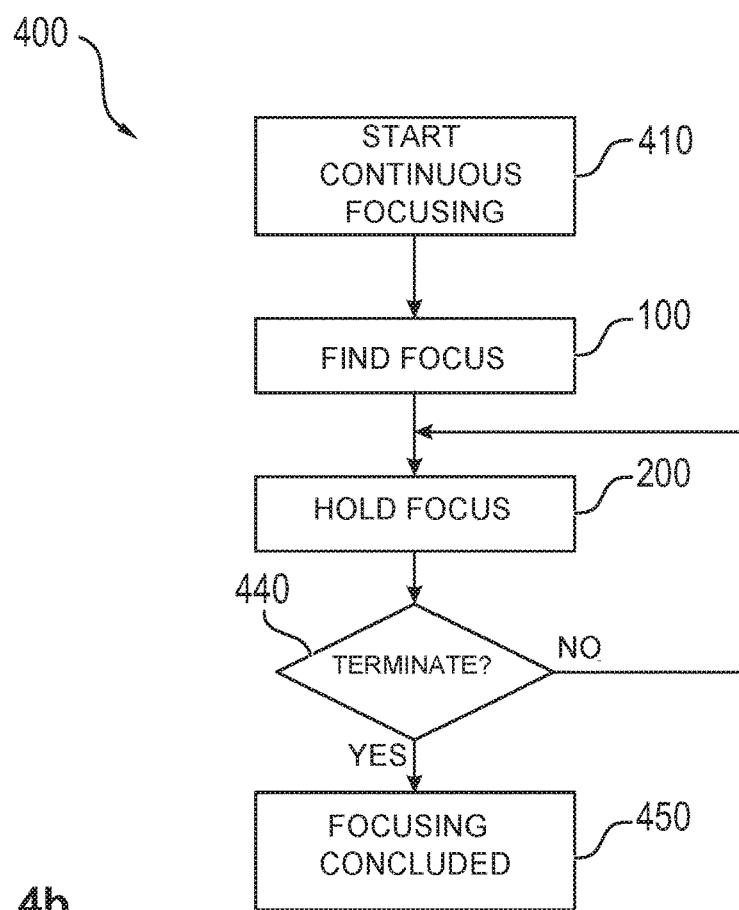
FIG. 4b is a flow chart of a method for carrying out continuous focusing, according to a further exemplifying embodiment of the present invention.
Figure 5:
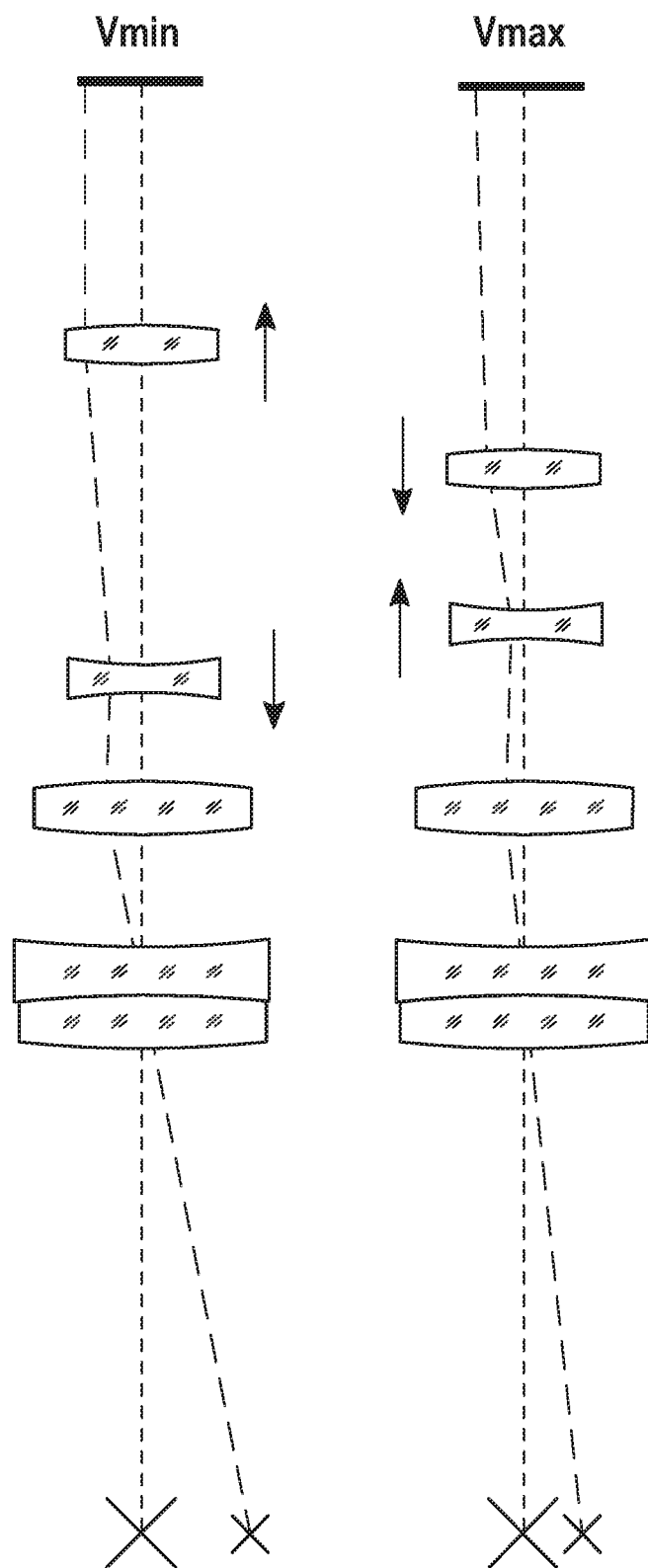
FIG. 5 shows an exemplifying embodiment of a microscope with digital image acquisition, having no autofocus system.
Figure 6:
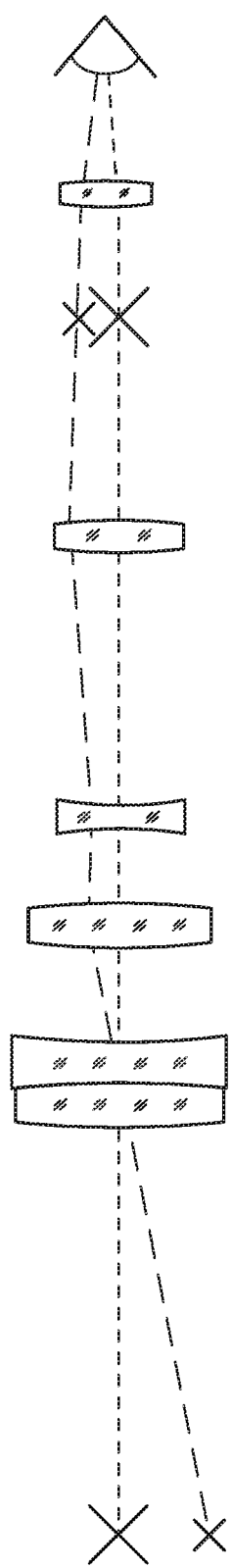
FIG. 6 shows an exemplifying embodiment of a microscope with visual viewing, having no autofocus system.
Figure 7:
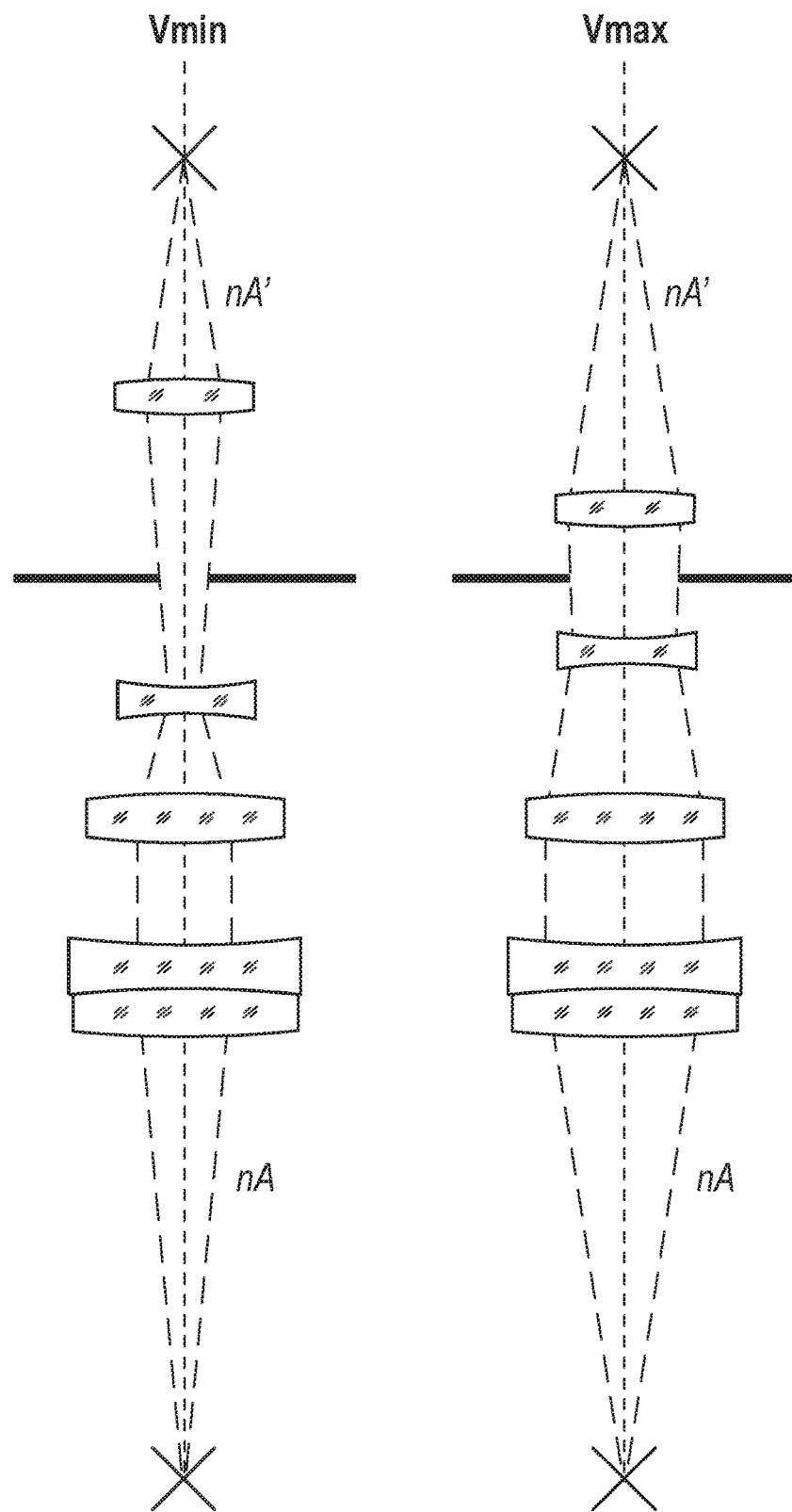
FIG. 7 shows an exemplifying embodiment of a microscope having a constant image-side numerical aperture and thus a constant spacing between the first and the second image sensor in an axial direction over the imaging scale.

FIG. 4b is a flow chart of a method 400 for carrying out continuous focusing, according to a further exemplifying embodiment of the present invention. Method 400 encompasses: step 410 labeled "Start continuous focusing," method 100 for finding the focus, method 200 for holding the focus, a step 440 for checking a condition for terminating the method, and a block 450 labeled "Focusing concluded." During step 410, continuous focusing using autofocus system 11 of microscope 10 is begun. Method 100 for finding the focus is then carried out. Method 200 for holding the focus is then carried out. During step 440, a check is made as to whether the condition for terminating the method is satisfied. The condition for terminating the method is predefined in such a way that the desired focusing precision is obtained. For the case in which the condition checked during step 440 is satisfied, termination of the method takes place so that focusing is concluded. Otherwise method 200 for holding the focus, and step 440 for checking the condition for termination, are carried out repeatedly. In method 400, shown in FIG. 4b, for carrying out continuous focusing, method 100 for finding the focus is carried out only one single time, while method 200 for holding the focus is repeated until the predefined termination condition is satisfied.

A second aspect of the present invention deals with the further disadvantage that the contrast profiles of images 16a, 16b acquired by image sensors 14a, 14b are respectively different for different objects to be examined.

With method 200, shown in FIG. 3, for carrying out comparatively fine focusing, the contrast difference is ascertained based on contrast values of first image 16a acquired by first image sensor 14a and of second image 16b acquired by second image sensor 14b. In addition, the relative location of focal plane 20 with respect to object plane 22 is set based on the ascertained contrast difference.

A further aspect of the present invention deals with the further disadvantage that with known autofocus systems, motion blur occurs as a result of image integration.

Autofocus system 11 of microscope 10 is preferably embodied in such a way that the relative location of focal plane 20 with respect to object plane is set, with a specific increment and at a specific focus displacement speed, during the image acquisition time for acquiring first image 16a acquired by first image sensor 14a and second image 16b acquired by second image sensor 14b. The focus displacement time is equal to the ratio of the increment to the image acquisition time. The increment is furthermore larger than the depth of focus of microscope 10. The maximum focus displacement speed at which focusing can reliably be carried out is preferably defined by the following equation:

$$V=(DOF \cdot ST)/AT$$

where V is the maximum focus displacement speed, DOF the depth of focus, and AT the image acquisition time, and where ST indicates a multiple of the depth of focus. The product DOF·ST corresponds to the increment during focusing.

Preferably the increment is larger than or equal to 2.5 times the depth of focus of microscope 10. The time required for focusing can thereby be considerably shortened.

In addition, reliable focusing can be carried out with an increment equal to as much as 10 times the depth of focus of microscope 10.

Setting of the focus is preferably carried out at a constant focus displacement speed. In order to shorten the time required for focusing, the focal plane can thus continue to be displaced at a constant speed even during image acquisition. This does result in a certain motion blur in the acquired images, but it has been recognized that no substantial reduction in precision is perceptible up to a displacement distance of 10 times the depth of focus per image acquisition time.

A multi-sensor microscope for automatic focusing is implemented in accordance with the present invention. The microscope is equipped with several image sensors for capturing the extended-area brightness information and color information of an image of the object, for automatic focusing onto the surface of the object. According to the present invention a corresponding method for rapid, precise, and reliable focusing is also implemented with the microscope.

The use of an optic having a constant image-side numerical aperture over the entire magnification range is advantageous. The distance, to be preselected on-site, between the sensors with respect to the nominal image plane can thereby be adjusted to an optimum dimension. The spacing with respect to the inflection point of the contrast curve is considered "optimum," since that is where the greatest slope, and thus the greatest precision for autofocus regulation, exist.

The system can be used in particular for a handheld microscope. In this case the movement of the focal plane does not necessarily occur in motorized fashion. By suitable feedback to the operator, the latter can also find and/or hold the focus him- or herself. Focus holding can also be accomplished in motorized fashion. With a small displacement range, short acquisition and evaluation times, and the smallest possible mass being moved, very short control times are achievable. Reliable stabilization of the focus location up to approximately an 80× magnification can thereby be achieved.

The precision of the system can be even further increased by compensating for vignetting and for the lateral offset of the two sensors 14a, 14b.

PARTS LIST

10 Microscope
11 Autofocus system
12a, 12b Beam path
14a, 14b, 25 Image sensor
16a, 16b, 30 Image
18a, 18b Image plane
20 Focal plane
22 Object plane
26 Objective
28a, 28b Beam splitter
32 Imaging system
33 Apparatus for stepless adjustment of imaging scale ("zoom")
34, 36 Tolerance region
100, 200, 300, 400 Method
110 to 132, 210 to 224 Method components
310, 340, 410, 440, 450 Method components

What is claimed is:

1. A microscope (10) for imaging an object located in an object plane (22), comprising:
   an autofocus system (11) for executing a focusing procedure to set a focal plane (20) of the microscope (10) relative to the object plane (22), the autofocus system (11) having a first image sensor (14a), arranged in a first outcoupled beam path (12a), for acquiring a two-dimensional first image (16a); and a second image sensor (14b), arranged in a second outcoupled beam path (12b), for acquiring a two-dimensional second image (16b),
   the autofocus system (11) being configured to ascertain a first contrast value of the first image (16a) and a second contrast value of the second image (16b), compute a contrast value difference between the first and second contrast values, and set a relative location of the focal plane (20) with respect to the object plane (22) based on the contrast value difference,
   the first and the second image (16a, 16b) each including image information furnished by the first and the second image sensor (14a, 14b) each configured as an area sensor,
   the autofocus system (11) being configured in such a way that the focusing procedure is executable on the basis of at least a first operating mode for coarse focusing and a second operating mode for fine focusing,
   wherein the coarse focusing of the first operating mode is carried out by acquiring the first image (16a) and the second image (16b) without displacing the object plane (22) relative to the focal plane (20);

wherein the autofocus system (11) is configured to set the relative location of the focal plane (20) with respect to the object plane (22) in the first operating mode in such a way that the focal plane (20) lies within a first tolerance region around the object plane (22), and to set the relative location of the focal plane (20) with respect to the object plane (22) in the second operating mode in such a way that the focal plane (20) lies within a second tolerance region around the object plane (22), the second tolerance region being smaller than the first tolerance region;

wherein the first tolerance region includes a capture region along the optical axis, within which capture region a direction for arriving at the focus position is determined by the autofocus system (11) based on a comparison of the first contrast value of the first image (16a) acquired by the first image sensor (14a) and the second contrast value of the second image (16b) acquired by the second image sensor (14b).

2. The microscope according to claim 1, the autofocus system (11) being configured in such a way that in the first operating mode the autofocus system (11) ascertains contrast values of the first image (16a) acquired by the first image sensor (14a) and of the second image (16b) acquired by the second image sensor (14b), and in the second operating mode the autofocus system (11) ascertains contrast values of the first image (16a) acquired by the first image sensor (14a) and of the second image (16b) acquired by the second image sensor (14b), and the autofocus system (11) sets the relative location of the focal plane (20) with respect to the object plane (22) based on the ascertained contrast values.

3. The microscope (10) according to claim 2, wherein the autofocus system (11) is configured to set the relative location of the focal plane (20) with respect to the object plane (22) in the second operating mode in such a way that the spacing between the focal plane (20) and the object plane (22) is decreased by an amount equal to an offset ascertained based on the contrast value difference.

4. The microscope (10) according to claim 1, wherein the autofocus system (11) is configured to set the relative location of the focal plane (20) with respect to the object plane (22), based on the direction for arriving at the focus position, in such a way that if the first contrast value of the first image (16a) acquired by the first image sensor (14a) is greater than the second contrast value of the second image (16b) acquired by the second image sensor (14b), the focal plane (20) is shifted toward the object plane (22), or the object plane (22) is shifted toward the focal plane (20), so that a spacing between the focal plane (20) and the object plane (22) decreases.

5. The microscope (10) according to claim 1, wherein the autofocus system (11) is configured to set the relative location of the focal plane (20) with respect to the object plane (22), based on the direction for arriving at the focus position, in such a way that if the second contrast value of the second image (16b) acquired by the second image sensor (14b) is greater than the first contrast value of the first image (16a) acquired by the first image sensor (14a), the focal plane (20) is shifted away from the object plane (22), or the object plane (22) is shifted away from the focal plane (20), so that a spacing between the focal plane (20) and the object plane (22) increases.

6. The microscope (10) according to claim 1, further comprising an imaging system (32) having: a third image sensor (25); an objective (26); a first beam splitter (28a); and a second beam splitter (28b), the first beam splitter (28a) being arranged in a beam path between the objective (26) and the third image sensor (25) and in the first outcoupled beam path (12a) between the objective (26) and the first image sensor (14a), and the second beam splitter (28b) being arranged in the beam path between the objective (26) and the third image sensor (25) and in the second outcoupled beam path (12b) between the objective (26) and the second image sensor (14b).

7. The microscope (10) according to claim 6, wherein the first beam splitter (28a) is configured to generate a first image plane (18a) conjugated with the object plane (22); and the second beam splitter (28b) is configured to generate a second image plane (18b) conjugated with the object plane (22).

8. The microscope (10) according to claim 7, wherein the first beam splitter (28a) and the second beam splitter (28b) are arranged, spaced apart from one another, in the beam path between the objective (26) and the third image sensor (25); the first image plane (18a) conjugated with the object plane (22) and the second image plane (18b) conjugated with the object plane (22) are located at a spacing from one another; and the spacing between the first image plane (18a) conjugated with the object plane (22) and the second image plane (18b) conjugated with the object plane (22) corresponds to the spacing between the first beam splitter (28a) and the second beam splitter (28b).

9. The microscope (10) according to claim 1, wherein the autofocus system (11) is configured in such a way that the focusing procedure executable based on the first operating mode is carried out only one single time, and the focusing procedure executable based on the second operating mode is repeated until a predefined termination condition is satisfied.

10. The microscope (10) according to claim 1, wherein the user can select on the first image sensor and/or the second image sensor a sub-region on which the focusing procedure is executable.

* * * * *